April 7, 1959  F. E. S. HUDSPETH ET AL  2,880,713
FUEL FLOW SCHEDULING MEANS FOR FUEL CONTROL SYSTEMS
Filed July 28, 1955  4 Sheets-Sheet 4

INVENTORS.
Frederick E. S. Hudspeth
Robert P. Graham
BY
ATTORNEYS.

United States Patent Office

2,880,713
Patented Apr. 7, 1959

2,880,713

FUEL FLOW SCHEDULING MEANS FOR FUEL CONTROL SYSTEMS

Frederick E. S. Hudspeth, Highland Park, and Robert P. Graham, Pontiac, Mich., assignors to Chrysler Corporation, Highland Park, Mich., a corporation of Delaware Application July 28, 1955, Serial No. 524,909

16 Claims. (Cl. 123—119)

This invention relates generally to fuel systems for use with internal combustion engines and more particularly to a fuel metering mechanism for regulating the flow of fuel to the engine combustion chamber in response to variations in an operating parameter of the engine.

The mechanism of our instant invention is particularly adapted to function as a constituent part of a fuel injection type fuel system although we contemplate that it may also have a variety of other applications. One fuel system with which the structure of our instant invention finds particular utility is that disclosed in the copending application of Clifton M. Elliott et al., Serial No. 504,577, filed April 28, 1955, said application being assigned to the assignee of our instant invention, and now abandoned. The fuel system of this copending application may be readily adapted to be used with internal combustion engines of conventional design and is characterized by its low operating fuel pressures and by separate air atomizing fuel nozzles associated with each of the individual engine cylinders. The system further includes a low pressure fuel and air pumping unit having separate low pressure fuel and air working chambers connected to the air atomizing nozzles by separate delivery passages. An engine speed responsive metering unit and an engine manifold pressure responsive metering unit are situated in series in the fuel delivery passage for varying the rate of fuel delivery in accordance with the changing engine fuel requirements. The above mentioned engine speed responsive metering unit will be hereinafter referred to as the speed sensor and the above mentioned engine manifold pressure responsive unit will be hereinafter referred to as the load sensor. Each of these sensor units is characterized by a fuel flow restricting orifice forming a portion of the above mentioned fuel passage means and the orifices are individually controlled by movable valve elements which function to variably adjust the effective fuel metering area of the orifices in response to variations in an associated operating parameter. The speed sensor is provided with a flexible diaphragm and the orifice restricting metering valve element is adjusted by this flexible diaphragm upon movement thereof. The fuel pressure differential across the orifice for the load sensor is conducted through suitable pressure passages to either side of the movable diaphragm of the speed sensor to actuate the latter independently of the engine speed during variations in engine load. The speed sensor includes governor means for adjusting the speed sensor metering element in response to variations in engine speed independently of the engine load, said governor means comprising an adjustable portion capable of moving the speed sensor metering valve element upon being adjusted in the direction of the valve movement by centrifugal weights, the latter being pivotally connected adjacent the axis of the adjustable portion upon an engine driven shaft with a portion thereof engaging said adjustable portion for actuating the latter.

In the embodiment disclosed in the above mentioned copending application, the valve actuating adjustable portion of the speed sensor is slidably carried by a telescopically related shaft and is shifted axially thereon as the centrifugal elements move radially inward or outward. In fuel metering devices used with other types of fuel metering valves, the element which would correspond to the above mentioned adjustable valve actuating portion may be slidably mounted within a stationary portion of the device or may be otherwise subjected to mechanical friction when it is actuated by the speed responsive governor mechanism. We have observed that inconsistent and non-uniform fuel scheduling at the lower portion of the speed range often results by reason of the mechanical friction which is inherent in structures of the type above disclosed. During low speed operation, the force which acts on the valve actuating portion of the speed sensor may be insufficient to actuate the movable valve element so that the displacement of the valve element will not be uniformly proportional to the square of the engine speed. An erratic, "fluttering" movement of fuel metering valve may result from the mechanical friction inherent in such a speed sensor unit and this in turn may cause intermittent fuel pressure variations in the fuel passage extending to the fuel nozzles. It has also been observed that these variations in fuel pressure causes fuel vapor formation by reason of an instantaneous reduction in the fuel pressure in the fuel delivery line to values equal to or lower than the vapor pressure of the fuel.

It is a principal object of our invention to provide an improved fuel metering device which is characterized by its simplicity and commercial adaptability and which avoids the above mentioned shortcomings of the prior art devices.

It is another object of our invention to provide an improved fuel metering mechanism for the fuel system of a heat engine having a valve controlled metering orifice wherein governor means are provided for varying the operating position of the valve portion so that the displacement of the latter is proportional in magnitude to the square of the engine speed throughout substantially the entire operating speed range.

It is another object of our invention to provide a fuel metering mechanism comprising a fuel flow restricting orifice and a metering valve for adjusting the effective area of the orifice wherein a governor means is provided for actuating the valve element so that the displacement of the latter is proportional to speeds of reduced magnitude as well as to speeds of higher magnitude.

It is a further object of our invention to provide a fuel metering device of the type set forth in the preceding objects wherein compensation is made for mechanical friction between the movable components.

Other objects of the invention will readily become apparent from the following general description and from the more particular description hereinafter included.

In carrying forth the preceding objects, we have provided a speed sensor unit of the type used in the internal combustion engine fuel injection system of the above copending application of Clifton M. Elliott et al. and which is further characterized by a vacuum chamber defined in part by a flexible diaphragm carried by the valve actuating portion of the speed governor means. In addition, passage means are provided for subjecting this vacuum chamber to engine intake manifold pressures for urging said valve actuating portion toward a valve opening position. We contemplate that the internal combustion engine will be provided with a throttle valve controlled intake duct and as the throttle valve is moved to a closed position, the pressures existing on the downstream side of the same will be reduced for any given engine speed. Accordingly, we have strategically located one or more openings in the intake manifold passage in the vicinity of the throttle valve, and the above mentioned passage means may be connected to this port to accommodate the transfer of manifold vacuum to the above mentioned vacuum chamber. The pressure differential which is thereby created across the valve actuator diaphragm causes the latter to become displaced and to bias the valve element toward an orifice opening position. This biasing effort assists the operation of the centrifugal governor mechanism in controlling the displacement of the valve means and the combined biasing effort is sufficient to overcome any mechanical friction which might be present in the valve adjusting components. Since the centrifugal governor mechanism is capable of independently shifting the orifice controlling valve at speeds greater than a predetermined limiting value, the vacuum chamber is caused to function only at the lower speed range and may be rendered inoperative at speeds greater than this predetermined value.

For the purpose of more particularly describing the novel features of our instant invention, reference will be made to the accompanying drawings wherein:

Figure 2 is a longitudinal cross sectional view of the improved speed sensor unit as shown in Figure 1;

Figure 6 is a cross sectional view showing certain of the valve details of the pumping unit of Figures 4 and 5 taken along section line 6—6 of Figure 5;

Figure 1:
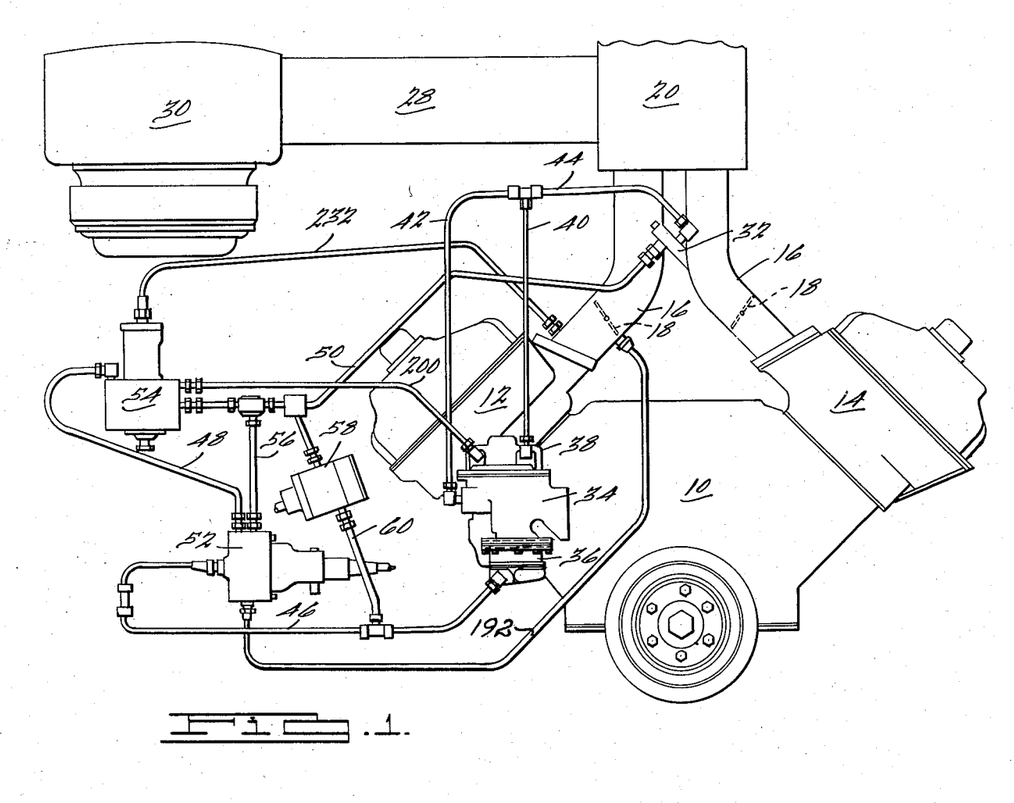
Figure 1 shows a schematic arrangement of a complete fuel control system embodying the improved speed sensor unit of our instant invention and adapted to be used with an internal combustion engine of conventional construction.

Referring first to Figure 1, a V-8 type internal combustion engine is designated by numeral 10 and it includes intake manifold structure 12 and 14. The engine is formed with a pair of cylinder banks and an intake manifold conduit communicates with each of the individual cylinders, said conduits being defined in Figure 1 by numeral 16. A separate throttle valve is rotatably mounted within each conduit 16 to control the distribution of combustible gases to the individual engine cylinders. By preference, the conduit 16 communicates with a common intake air distribution chamber 20 which may be supplied with intake air through a conduit 28 which communicates with the ambient air through a suitable intake air filter chamber defined by numeral 30.

The fuel system for the engine 10 comprises a plurality of air atomizing nozzles 32 situated within the conduits 16 on the upstream side of the throttle valves 18. By preference, a separate nozzle is associated with each conduit 16. The air atomizing nozzles 32 are adapted to supply the individual conduits 16 with a continuous atomized fuel spray which is mixed with the intake air supplied by the distribution chamber 20. The working pressures for the nozzles 32 are of a low order of magnitude in comparison with the operating pressures of other types of fuel injection systems commonly employed.

A low pressure fuel and air pumping mechanism is generally designated in Figure 1 by numeral 34 and it includes separate fuel and air pumping portions shown at 36 and 38, respectively. The air pumping portion 38 is of the double acting type and it includes a pair of air delivery conduits 40 and 42 which communicate with a common delivery conduit 44 extending to the nozzles 32. The fuel pumping portion 36 also communicates with each of the individual nozzles 32 through conduit structure which includes conduit 46, conduit 48, and conduit 50. The improved speed sensor unit of our instant invention is shown at 52 and it may be situated in the fuel delivery conduit structure with the conduits 46 and 48 communicating therewith. A load sensor unit 54 is disposed in the fuel delivery conduit structure in series with the speed sensor 52, the conduits 48 and 50 communicating therewith as shown. A conduit 56 interconnects the downstream side of the load sensor 54 with the speed sensor 52 in order that the speed sensor 52 might be sensitive to fuel metering adjustments made by the load sensor 54.

An accelerator pumping mechanism may be provided in a circuit as shown at 58 and it may be situated in a conduit 60 which bypasses the above-mentioned speed sensor 52 and the load sensor 54 to provide a direct delivery of fuel from the fuel pumping portion 36 of the pumping unit 34 to the nozzles 32 during acceleration of the vehicle.

Referring next to Figure 2, the improved speed sensor unit 52 of our instant invention comprises a housing structure having a first housing section 64, an intermediate section 66, and an end closure section 68. The housing section 64 is provided with an interior cavity 70 which communicates with an elongated end opening 72, the latter being adapted to receive a driving shaft 74. This shaft 74 is rotatably journalled within the opening 72 by spaced bearings 76 and 78 and an adaptor 80 is threadably connected at 82 to the end of the shaft 74 as shown. A pin 84 may be fixed within transversely aligned openings in the shaft 74 and the adaptor 80. A shoulder 86 may be formed on the end of the shaft 74 and the adaptor 80 contacts the shoulder 86 and overlaps the inner race of bearing 78 to prevent an axial shifting movement of the shaft 74 with respect to the housing section 64.

The other end of the shaft 74 is radially flanged at 88 and the outer race of the bearing 76 is adapted to engage a shoulder 90 formed in the opening 72 of the housing section 64. The flange 88 prevents a shifting movement of the shaft 74 with respect to the housing 64 in the other axial direction.

A channel section 92 is connected by the end of the shaft 74 and a pair of centrifugal weights 94 and 96 are pivotally joined at radially spaced locations to the channel sections 92. The pivot points for the centrifugal weights 94 and 96 are designated by numerals 98 and 100, respectively.

A reduced diameter extension of the shaft 74 is indicated at 102 and a sleeve element 104 is slidably positioned over the shaft portion 102. A flange 106 is formed on the sleeve 104 and is engaged by the centrifugal weights 94 and 96, said weights being notched at 108 and 110, respectively, to receive the flange 106. When the centrifugal weights 94 and 96 are pivoted about their respective pivot points, the sleeve 104 is caused to shift in an axial direction by reason of the positive connections between the weights 94 and 96 and the flange 106. The centrifugal weights 94 and 96 may be caused to move in a radially outward direction upon rotation of the shaft 74 which may be drivably connected to a suitable engine driven cable or other driving member by means of the adaptor 80.

The intermediate housing section 66 may be secured to the axial end of the housing section 64 by bolts 112 and it may comprise a recessed portion defining in part a fluid pressure chamber 114. The housing section 66 may be further comprised of a wall portion 116 having a central opening 118 within which is received a bearing sleeve 120, the latter being secured to one side of the wall section 116 by suitable screws 122. The wall portion 116 may be recessed on the opposite side thereof as indicated at 124 and an adaptor 126 may be received within the recess 124 and secured therein by bolts 128. A flexible diaphragm 130 is secured between the juxtaposed surfaces of the recess 124 and the adaptor 126, said diaphragm extending transversely across an enlarged diameter portion 132 of the opening 118 to partly define a pair of opposed fluid chambers 134 and 136. A second flexible diaphragm 138 is transversely disposed across one side of the adaptor 126 and is secured about its periphery by a member 140, the latter being secured in place by the aforementioned bolts 128.

The diaphragms 130 and 138 are centrally secured to a common shaft 142 which may be slidably received within the aforementioned bearing sleeve 120. By preference, the shaft 142 is comprised of a three-part construction as indicated at 144, 146, and 148. The part 146 is centrally disposed between the parts 144 and 148 and is provided with reduced diameter threaded ends, each of which may be threadably received within one of the adjacent parts 144 and 148. The adjacent ends between the parts 146 and 148 are adapted to clampingly engage a pair of washer members seated on either side of the flexible diaphragm 148 to provide a permanent connection between the diaphragm 138 and the shaft 142. Similarly, the adjacent ends of the parts 144 and 146 are adapted to clampingly engage another pair of washers seated on either side of the diaphragm 130 to provide a permanent connection between this latter diaphragm and the shaft 142. The effective diameter of the diaphragm 138 is larger than that of the diaphragm 130 for purposes which will subsequently become apparent from the statement of the operation of the invention. The fluid pressure chamber 114 communicates with the above mentioned conduit 56 and a suitable threaded fluid fitting 140 may be provided for this purpose.

The end housing section 68 may be secured to the intermediate housing section 66 by bolts 152 and a third flexible diaphragm 154 may be secured about its periphery by the juxtaposed surfaces of the housing sections 66 and 68, the effective diameter of the diaphragm 154 being greater than the diameter of either of the previously described diaphragms 130 or 138. The diaphragm 154 partly defines a pair of opposed fluid pressure chambers 156 and 158 on either side thereof, the former communicating with the previously described conduit 48. A suitable fluid fitting 160 may be provided to accommodate this connection with the conduit 48.

The end housing section 68 is formed with a central threaded opening 162 within which is received an orifice element 164. The element 164 is formed with an axially extending central opening 166 which communicates with the fluid pressure chamber 156 through a fluid flow restricting orifice 168 and an adjustable valve element 170 is slidably disposed within the interior 166 of the element 164, said valve element 170 being provided with a tapered end 180 which is adapted to register with the orifice 168 to vary the effective size of the orifice 168. The valve element 178 may be urged into registry with the orifice 168 by a compression spring 182.

The flexible diaphragm 154 is centrally secured to the above described shaft 142 by a threaded member 184 received within the end of the shaft part 144. A pair of washers 186 and 188 are clamped between the threaded member 184 and the end of the shaft part 144 on opposed sides of the diaphragm 154 to form a permanent connection between the diaphragm 154 and the shaft 142.

We have also shown in Figure 2 a portion of one of the intake manifold conduits 16 and its associated throttle valve 18. One or more ports 190 may be formed in the wall of the conduit 16 in the vicinity of the edge of the throttle valve 18 when the latter assumes a closed or partially closed position. The ports 190 are arranged to communicate with pressure passages 192, the latter being provided with suitable fittings 194 to facilitate a connection with the conduit 16 at one end thereof, as shown. The other end of the conduits 192 communicate with a passage 196 formed in the wall portion 116 of the intermediate housing section 66. The passage 196 extends to the interior of the above described chamber 136, the latter being situated between the diaphragm 130 and the relatively large diaphragm 138.

Upon movement of the throttle valve 18 toward a closed throttle position during idling or part load operation of the engine, the ports 190 are subjected to reduced manifold pressure and this signal is conducted to the speed sensor chamber 136 through the conduits 192 and passage 196 for the purpose of effecting the movement of the shaft 142 in the lower portion of the operating speed range during part throttle operation. This reduction in pressure in the vicinity of the ports 190 is due in part to the reduced static pressure accompanying the increase in air velocity past the throttle valve.

For the purpose of providing a more complete understanding of the functional relationship between the speed sensor unit of our instant invention and certain other of the principal components of the fuel injection system, reference will next be made to Figure 3 which shows the essential details of the load sensor unit which cooperates with the speed sensor of our instant invention to regulate and schedule the flow of fuel to the engine as determined by the fuel requirements. The load sensor unit 54 comprises a first housing section 198 and a second housing section 200 secured in end to end relationship as shown. The housing section 198 comprises an internal fuel chamber 202 and a central opening 204 which communicates with the central chamber 202. A hollow orifice element 206 is threadably received within the opening 204 and it is formed at the inner end thereof with a flow restricting orifice 208. The hollow interior of the orifice element 206 is adapted to slidably receive a metering element 210 which is formed with an elongated tapered metering rod 212, the latter extending axially through the orifice 208.

Figure 3:
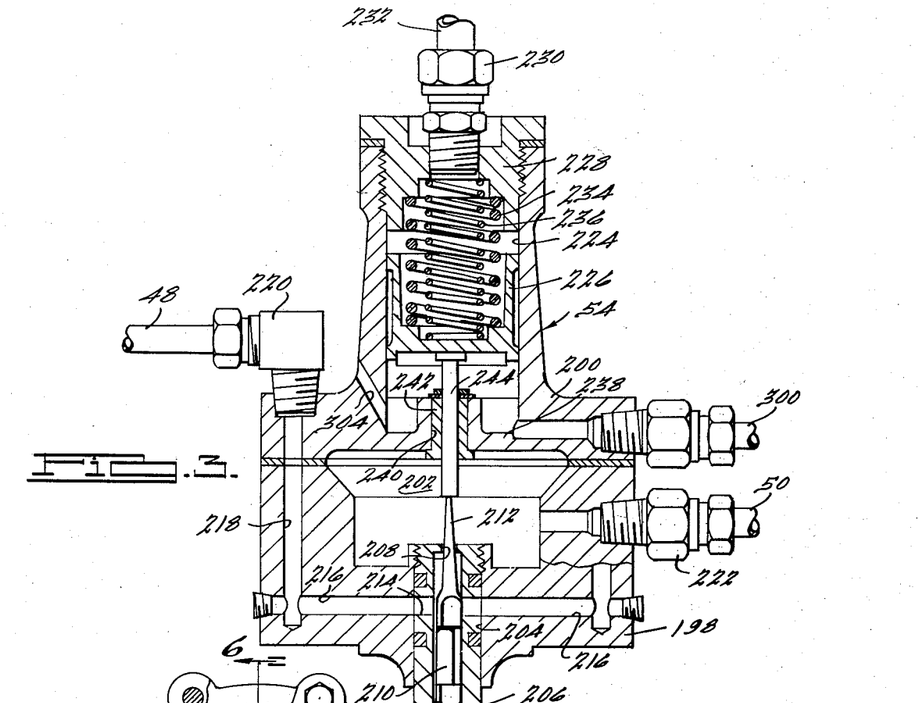
Figure 3 is a cross sectional view of a load sensor unit capable of being used with the speed sensor unit of Figure 2 in the system shown in Figure 1.

The orifice element 206 is formed with one or more radially extending ports 214 which communicate with passages 216 formed in the housing section 198 as indicated in Figure 3. The passages 216 in turn communicate through another passage 218 with the previously described conduit 48 extending from the speed sensor 52. Also, the interior fuel chamber 202 communicates with the previously described conduit 50 extending to the air atomizing nozzles 32. Suitable fittings 220 and 222 may be provided to accommodate the connections of the conduits 48 and 50, respectively, with the load sensor.

The housing section 200 includes an elongated section defining a cylinder 224 within which an engine vacuum actuated piston 226 is slidably received. The cylinder 224 receives an end closure member 228 which threadably receives a fluid fitting 230 to accommodate a connection between the interior of the cylinder 224 and the intake manifold conduits 16 on the downstream side of the throttle valve 18. As best seen in Figure 1, this connection is provided by means of a conduit 232. The piston 226 is biased in an axial direction by a pair of compression springs 234 and 236 seated on the closure member 228. A decrease in the engine load will be accompanied by a corresponding decrease in the engine intake manifold pressure and this load signal is communicated to the cylinder 224 through the conduit 232 thereby causing the piston 226 to move against the biasing effort of the springs 234 and 236. Conversely, upon an increase in engine load, the engine intake manifold pressure will be caused to increase and this in turn will permit the springs 234 and 236 to adjust the piston 226 in the opposite direction. The housing section 200 includes a wall portion 238 which defines one end of the cylinder 224. The wall portion 238 is formed in the central opening 240 within which is received a bushing 242 for slidably receiving a constant diameter section 244 of the metering rod 212.

Figure 4:
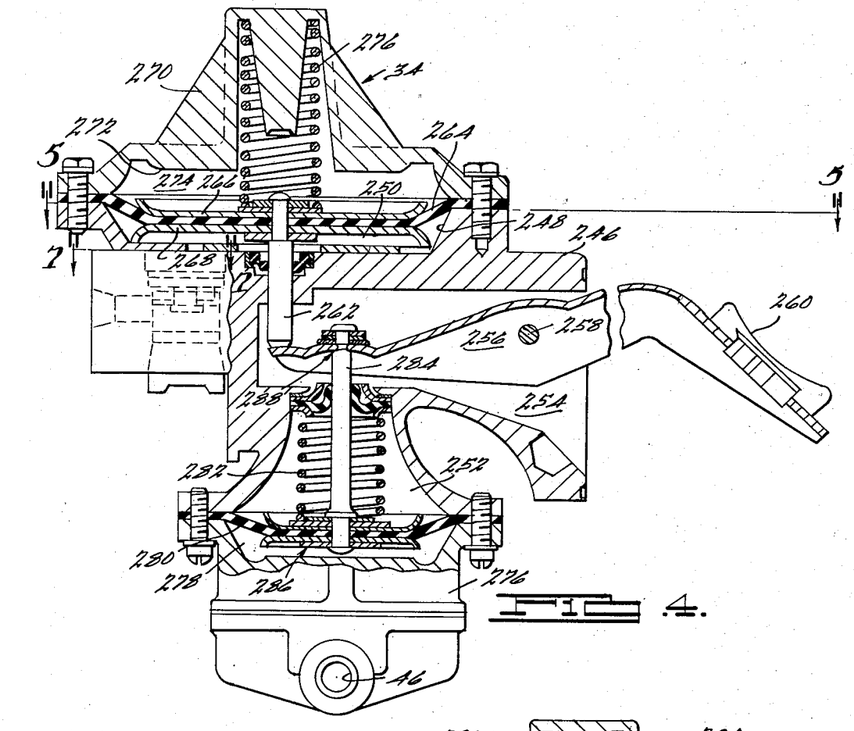
Figure 4 is a cross sectional view of a fuel and air pumping unit adapted to function as a pressure source for the liquid fuel and air used by the air atomizing nozzle of the system shown in Figure 1.

Referring next to Figure 4 the low pressure fuel and air pumping unit 34 is comprised of a main body section 246 which is formed with a recess 248 on the upper side thereof to partly define an air working chamber 250. The other side of the body section 246 is formed with a spring chamber 252. A lateral opening 254 is formed in the body section 246 intermediate the upper and lower ends thereof for the purpose of receiving a rocker shaft 256 which may be pivoted within the opening 254 at 258. The extended end of the rocker shaft 256 carries a cam follower element 260 which may engage an engine driven camshaft to effect an oscillating movement of the rocker shaft 256 about the pivot point 258. The inner end of the rocker shaft 256 engages in air diaphragm actuating shaft 262 which may be slidably positioned within the section 246 and centrally secured to a flexible air diaphragm 264, the latter being transversely disposed across the air working chamber 250. The connection between the shaft 262 and the central portion of the diaphragm 264 may include a pair of washers 266 and 268 situated on either side of the diaphragm 264 together with means for permanently securing the washers 266 and 268 to the end of the shaft 262.

The pumping unit 34 further includes an upper housing portion 270 which is recessed at 272 to define a second air working chamber 274, and a spring 276 may be interposed between the air diaphragm 264 and the housing portion 270 for biasing the diaphragm 264 in a downward direction.

The pumping unit 34 further includes a lower housing portion 276 which defines a fuel working chamber 278 below the fuel working diaphragm 280, the latter being transversely disposed across the above described spring chamber 252 and secured about its periphery between the intermediate body section 246 and the lower housing portion 276. A spring 282 is situated within the spring chamber 252 for the purpose of normally biasing the fuel diaphragm 280 in a downward direction thereby pressurizing the fluid in the fuel working chamber 278. Suitable valve controlled fuel delivery passage means may communicate with the fuel chamber 278 for the purpose of supplying the latter with combustible fuel during an upward movement of the fuel diaphragm 280. The previously described fuel delivery conduit 46 may also communicate with the fuel chamber 278 at the location indicated in Figure 4. A one-way check valve of conventional construction may be employed for controlling the delivery of fuel through the conduit 46.

The fuel diaphragm 280 may be actuated in a vertical direction by means of an actuator shaft 284 centrally secured to the diaphragm 280 by a conventional connection means generally designated by the numeral 286. A lost motion connection between the inner extension of the rocker shaft 256 and the actuator shaft 284 may be provided as indicated at 288, said lost motion connection providing for a positive upward displacement of the vacuum diaphragm 264 while accommodating an independent movement of the fuel diaphragm 280 in a downward direction under the influence of the pressure exerted by the spring 282.

Figure 5:
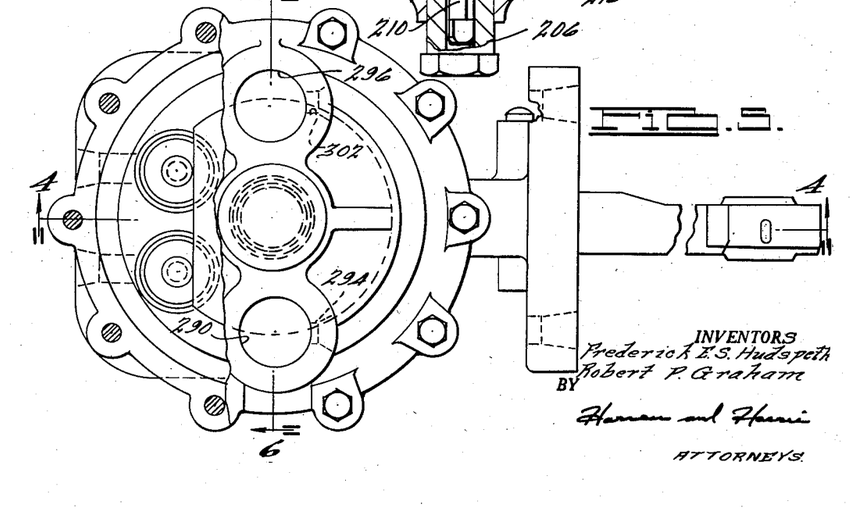
Figure 5 is a plan view of the fuel and air pumping unit of Figure 4.
Figures 5, 7:
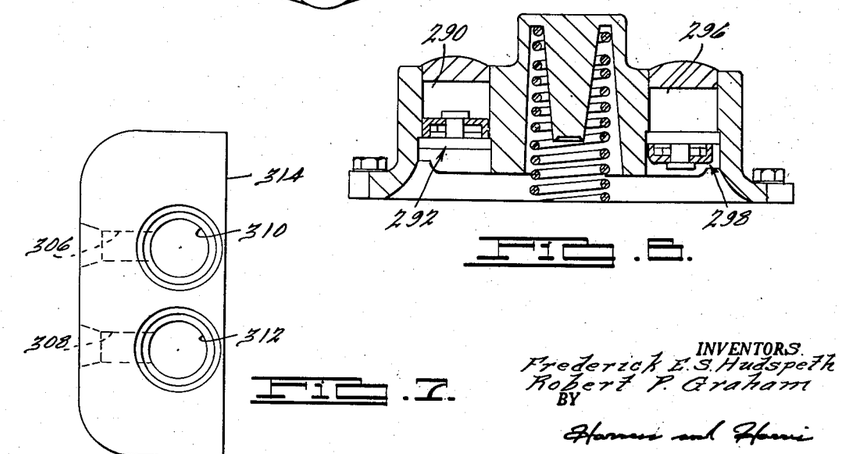
Figure 7 is a view of a portion of the control valves for the air pumping portion of the pumping unit of Figures 4 and 5 and is taken along section line 7—7 of Figure 4.

For the purpose of briefly describing the connection between the air pumping portion 38 of the pumping unit 34 with the air atomizing nozzles 32, reference may be made to Figures 5, 6, and 7 wherein the upper housing portion 270 is provided with a valve chamber 290 in which a one-way check valve 292 of conventional construction is received. An opening 294 communicates with the valve chamber 290 to facilitate a connection with the air delivery conduit 40 illustrated in Figure 1. Another valve chamber 296 is formed in the upper housing portion 270 and another one-way check valve 298 is received therein to control the delivery of air to the air working chamber 274 from a conduit 300 shown in Figure 1, said conduit being received within an opening 302 communicating with valve chamber 296. The conduit 300 extends to the load sensor unit 54 and it communicates with the cylinder 224 below the piston 226 as illustrated in Figure 3. This portion of the cylinder 224 is vented to the atmosphere through a port 304. In addition to supplying the air pumping chamber 274 with air, the conduit 300 is also capable of conducting any fuel leaking past the bushing 242 into the air working chamber 274 from which it may be expelled into the conduit 40 for ejection by the nozzle 32.

The lower air pumping chamber 250 communicates with a valve controlled inlet air passage 306 and with an air delivery passage 308 as seen in Figure 7. These passages respectively communicate with valve chambers 310 and 312 and may receive one-way check valve mechanisms similar to that illustrated in Figure 6. The valve body 314 within which the valve chambers 310 and 312 are formed may be secured to the intermediate body section 246 of the pumping unit 34, as illustrated in Figure 4. The air delivery conduit 42 is adapted to communicate with the passage 308. In the operation of the fuel injection system, the fuel and air pumping unit 34 is continuously actuated during operation of the engine and air will be delivered to the air delivery conduit 44 both upon an upward movement of the air diaphragm 264 and during movement of the diaphragm 264 in the downward direction, said upward movement being caused by a clockwise rotation of the rocker shaft 256 about the pivot joint 258, and said downward movement effected by the biasing effort of the spring 276. Similarly, the rocker shaft 256 is effective to deflect the fuel diaphragm 280 in an upward direction and the downward working stroke of the diaphragm 280 takes place under the fuel spring 282. The pump fuel is then conducted past the metering element 178 of the speed sensor unit and through the orifice 168 in the pressure chamber 156. The fuel is then conducted through the conduit 48 into the hollow interior of the orifice element 206 and then through the fuel metering orifice 208 into the load sensor unit. The fuel is then conducted from the chamber 202 through the delivery conduit 50 into the air atomizing nozzle 32. Engine speed signals are directly delivered to the speed sensor unit to cause the centrifugal weights 94 and 96 of the governor mechanism to rotate about the axis of the shaft 74. It will be apparent that as the speed increases for any given engine load, the shaft 142 and its coupled diaphragms will be shifted to the left, as viewed in Figure 2, thereby decreasing the degree of restriction of the fuel metering orifice 168 to provide an increased fuel flow rate to meet the operating requirements of the engine. Upon a variation in engine load, the engine load signal transferred to the load sensor unit will cause the position of the metering rod 212 to become adjusted thereby varying the degree of restriction of the fuel metering orifice 208, said metering rod moving in a downward direction upon an increase in engine load and in an upward direction upon a decrease in engine load as previously explained. The pressure drop existing across the fuel metering orifice 208 is communicated across the main diaphragm 154 of the speed sensor unit so that appropriate adjustments in the position of the valve element 180 and the speed sensor unit may be made to accommodate the changed flow requirements made necessary by the adjusted tapered metering rod 212.

As previously mentioned, the displacement of the metering valve element 180 in the speed sensor unit should vary in proportion to the square of the magnitude of the speed signal, but the axial shifting force exerted by the centrifugal weights 94 and 96 on the shaft 142 may be insufficient to adjust the position of the shaft 142 uniformly in accordance with the square law relationship. Such a condition might well occur during low speed part throttle operation when the throttle valves 18 approach the position shown in Figure 2. However, when the throttle valves 18 assume the position indicated, the static pressure existing in the vicinity of the manifold ports 190 decreases and this reduced manifold pressure is communicated to the chamber 136 between the diaphragms 130 and 138. This reduced pressure in the chamber 136 will create an axial shifting force on the shaft 142 by reason of the pressure differential across the diaphragm 138, and a similar axial force will be created in the opposite direction by reason of the pressure differential across the diaphragm 130. But since the effective area of the diaphragm 138 is larger than the diaphragm 130, the resultant axial force exerted on the shaft 142 will be in a left hand direction as viewed in Figure 2. This resultant axial force supplements the axial force exerted by the centrifugal governor mechanism. Since the intake manifold vacuum is dependent upon the engine load, it will also be dependent upon the fuel requirements when the engine is operating in the idle and part load ranges. As the engine speed increases substantially beyond the idling speed, the supplemental vacuum signal obtained from the intake manifold ports 190 will die out and axial adjustment of the valve metering element 178 in the speed sensor unit will thereafter be controlled by the centrifugal governor. However, in this increased speed range the centrifugal governor will follow the square law relationship and the need for an auxiliary vacuum boost does not exist.

The flexible diaphragm 130 in addition to partly defining the pressure chamber 136 is adapted to function as a fuel sealing element to contain the fuel within the pressure chamber 114. Such a construction obviates the need for using a sliding friction type seal at this location and the sensitivity of the unit is correspondingly increased.

The metering characteristics of the valve controlled metering orifice may be altered as desired to accommodate any given operating requirement. For example, the size and location of the ports 190 may be varied to produce a richer fuel mixture during idling operation of the engine than that which would be obtained if the metering valve element were adjusted in accordance with the square law relationship. Also, the relative sizes of the coupled diaphragms 130 and 138 may be varied to produce this same result.

Figures 7, 8, 9:
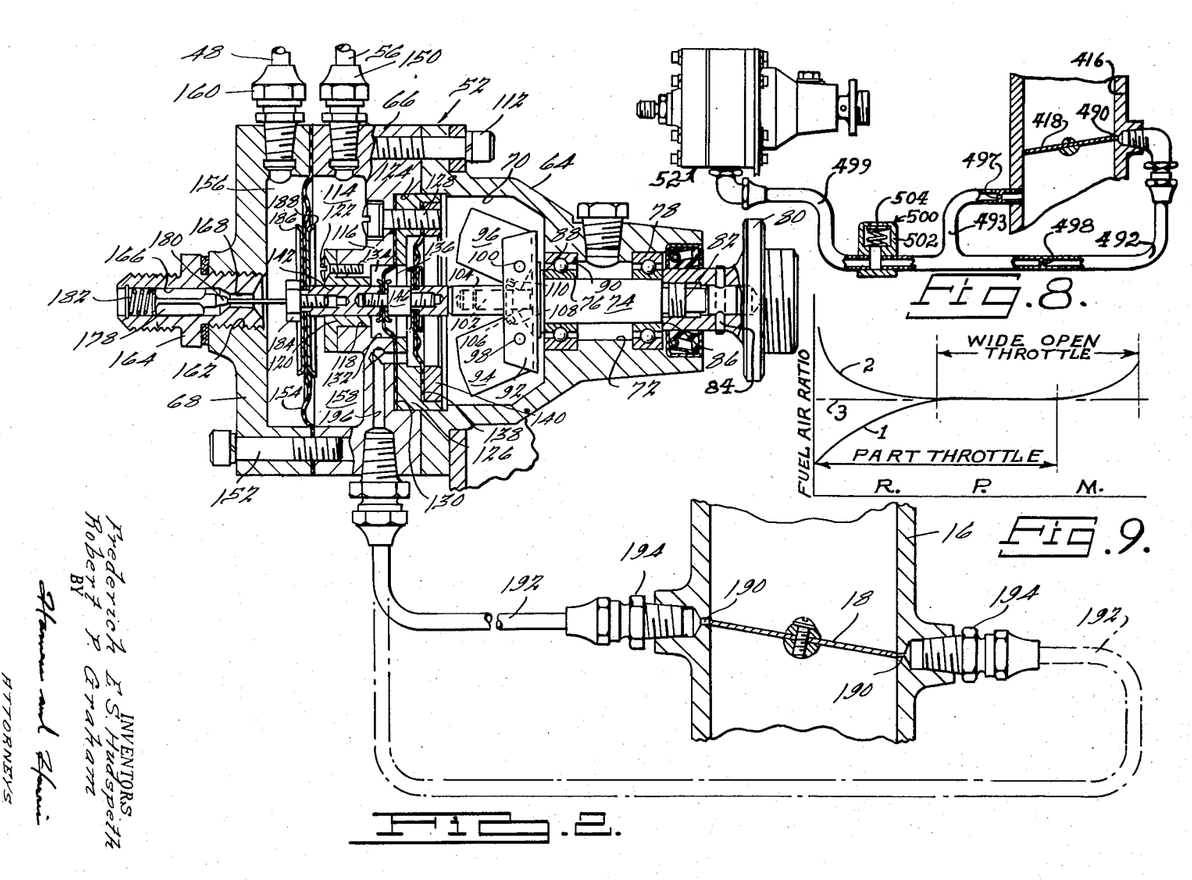
Figure 8 shows a modified conduit arrangement for obtaining an engine vacuum signal for the improved speed sensor unit of our instant invention.
Figure 9 is a graphical representation of the variation in fuel-air ratio of the engine speed for various types of metering units.

As an illustration of the above, reference may be had to Figure 9 wherein we have shown a graphical representation of the variation in fuel-air ratio throughout the operating speed range of the engine. Curve No. 1 illustrates the characteristic curve which would be obtained with a fuel system employing a speed sensor unit which lacks the above-described vacuum boosting chamber. It may be observed that the magnitude of the fuel-air ratio illustrated by curve No. 1 drops off rather sharply at the lower engine speeds. It is desirable to increase the magnitude of the fuel-air ratio in this lower speed range in order to obtain proper combustion and accordingly metering characteristics of the speed sensor unit may be altered, as above described, to provide the more desirable fuel-air ratio variation with engine speed as illustrated by curve No. 2 in Figure 9. For purposes of comparison, the horizontal line identified in Figure 9 by numeral 3, represents the metering characteristics of the speed sensor unit if the unit is calibrated to follow the square law relation throughout the entire speed range.

The strategic positioning of the ports 190 so as to provide a given metering characteristic of the system, may under some circumstances present a problem since a slight variation in the position of the ports 190 with respect to the edge of the throttle blade may result in a very large variation in the magnitude of the vacuum boost. We have, therefore, provided a modified means for transmitting a vacuum signal to the speed sensor unit from the engine manifold as illustrated in Figure 8. The arrangement as shown in Figure 8, includes a first vacuum conduit 492 which extends to a port 490 located in the intake manifold conduit 416 for an engine not shown. The manifold conduit 416 may be one of several conduits within which a throttle valve element 418 is mounted for rotation. A branch conduit 493 extends from the intake manifold conduit 416 on the downstream side of the throttle valve element 418 to the vacuum conduit 492. A precalibrated orifice 498 may be formed in the vacuum conduit 492 and a similar orifice 497 may be situated in the vacuum conduit 493. The vacuum conduits 492 and 493 may be connected to the passage 196 and the vacuum chamber 136 of the speed sensor unit 52 previously described by a common vacuum conduit 499. An air valve 500 is situated in the vacuum conduit 499 and it may include a housing 502 having a central opening communicating with the vacuum passage 499 and a valve disc 504 arranged to open or close a central valve opening to the atmosphere, said valve disc being spring biased toward a closed position.

When the valve element 418 assumes an off idle position, the static pressure at the port 490 will be reduced thereby causing the valve disc 504 to become unseated to permit the flow of air through the vacuum conduit 492 into the intake manifold conduit 416. The orifice 498 may be accurately calibrated so as to provide the desired static pressure on the upstream side thereof and in the auxiliary vacuum boost chamber of the speed sensor. By preference, the air valve 500 assumes an open position at negative pressures greater than 3 in. Hg.

As the throttle valve 418 moves closer to the closed throttle position, the port 490 may become exposed to atmospheric pressure and the vacuum conduit 493 is effective to compensate for the resulting loss in vacuum signal. The negative pressure in the conduit 493 increases as the throttle valve 418 approaches the closed position, the decrease in the vacuum signal in the conduit 492 being accompanied by this increase in vacuum signal. The orifice 497 may be accurately precalibrated to provide the desired magnitude of the vacuum signal obtained from the downstream side of the intake manifold conduit 416.

Although we have particularly described a particular embodiment of our instant invention, we contemplate that many modifications of the same may be made without departing from the scope of the invention as defined by the following claims.

We claim:

1. In a fuel control system for a liquid fuel engine having a throttle valve control intake manifold conduit, an air atomizing nozzle positioned in said conduit, a low pressure fuel and air pumping unit for supplying said nozzle with liquid fuel and fuel atomizing air, separate conduit structure for conducting air and liquid fuel from said pumping unit to said nozzle, a first and a second fuel flow restricting orifice positioned in series in said fuel conduit structure and forming a portion of the same, a flow restricting valve element registering with each of said orifices, means for adjusting the position of one of said valve elements in response to variations in engine load, engine speed responsive governor means for adjustably positioning the other of said valve elements, a movable wall carried by a portion of said governor means and conduit means for conducting engine intake manifold pressure to one side of said movable wall to supplement the valve element adjusting effort of said governor means.

2. In a fuel injection system for a liquid fuel internal combustion engine having a throttle controlled intake manifold conduit, a low pressure air atomizing nozzle situated in said intake manifold conduit, a fuel and air pumping unit for supplying said nozzle with liquid fuel and fuel atomizing air, conduit structure including separate portions for conducting liquid fuel and fuel atomizing air from said pumping unit to said nozzle, first and second fuel flow restricting orifices situated in series in said fuel conduit portion, a first valve element registering with said first orifice to vary the effective flow restricting area of the same, means for adjustably positioning said first valve element in response to variations in engine load to adjust the flow delivery rate to said nozzle to accommodate varying the fuel requirements accompanying said engine load variation, a second valve element registering with said second orifice, engine speed responsive governor means for adjustably positioning said second valve element, said governor means comprising a movable element adapted to effect fuel metering adjustments of said second valve element and an engine driven element connected to said movable element for actuating the latter, a pressure chamber defined by a portion of said movable element, and conduit means interconnecting said pressure chamber with said intake manifold conduit for creating a pressure force on said movable element to assist said governor means in effecting valve metering adjustments of said second valve element during operation of said engine in the lower speed range.

3. In a fuel injection system for use with a liquid fuel internal combustion engine having an intake manifold conduit, said system including a liquid fuel nozzle means for supplying said manifold conduit with a supply of liquid fuel, and fuel conduit structure for supplying said nozzle means with liquid fuel; a fuel metering mechanism disposed in said conduit structure comprising an orifice partly defining said conduit structure, a valve element disposed in registry with said orifice, engine speed sensitive governor means for adjusting the relative position of said valve element with respect to said orifice for scheduling the flow of fuel through said conduit structure, said governor means including a movable member adapted to effect the fuel scheduling adjustments of said valve element in response to variations in engine speed, and means responsive to engine manifold pressure effective to supplement said governor means in actuating said movable member as an inverse function of said pressure.

4. In a fuel injection system for use with a liquid fuel internal combustion engine having an intake manifold conduit with a throttle valve rotatably mounted in said conduit, said system including a liquid fuel nozzle means for supplying said manifold conduit with a supply of liquid fuel, and fuel conduit structure for supplying said nozzle means with liquid fuel; a fuel metering mechanism comprising a fuel flow restricting orifice forming a part of said conduit structure, a flow metering valve element registering with said orifice, engine speed responsive governor means for adjustably positioning said valve element with respect to said orifice, said governor means including a movable member adapted to effect metering adjustments of said valve element, a pressure chamber defined in part by said movable member and effective to assist said governor means in positioning said valve element to open said orifice as an inverse function of the pressure to which said chamber is subjected, and means for subjecting said pressure chamber to intake manifold pressure, thereby to assist said governor means in effecting said metering adjustments during the operation of said engine at low speeds and low manifold pressure.

5. In a fuel control system for a liquid fuel engine having an intake manifold conduit with a throttle valve mounted within said intake conduit, said system including a fuel delivery conduit extending to said engine; a fuel flow restricting orifice disposed in said fuel delivery conduit, a metering valve element registering with said orifice, governor means or adjustably positioning said valve element in response to variations in engine speed including an engine driven portion and a movable portion engaged by said driven portion, said movable portion being adapted to effect metering adjustments of said valve element, a movable wall carried by said movable portion, and conduit structure extending from said intake manifold to one side of said movable wall for creating a pressure differential thereacross effective to assist said governor means in positioning said valve element to open said orifice as an inverse function of the intake manifold pressure, thereby to assist orifice opening adjustments of said valve element during operation of said engine in the lower speed range.

6. In a fuel control system for a liquid fuel engine having an intake manifold conduit with a throttle valve mounted within said intake conduit, at least one port formed in said intake conduit sufficiently close to the peripheral edge of said throttle valve so that the manifold pressure at said port is substantially influenced by the relative positions of said edge and port when said throttle valve is adjacent its closed position, said system including a fuel delivery conduit extending to said engine; a fuel flow restricting orifice disposed in said fuel delivery conduit, a metering valve element registering with said orifice, governor means for adjustably positioning said valve element in response to variations in engine speed including an engine driven portion and a movable portion engaged by said engine driven portion, said movable portion being adapted to effect the metering adjustments of said valve element, a movable wall carried by said movable portion, and conduit structure interconnecting said port and one side of said movable wall for creating a pressure differential across the latter effective to assist said governor means in positioning said valve element to open said orifice as an inverse function of said manifold pressure during idle and part load operation.

7. In a fuel control system for a liquid fuel engine having an intake manifold conduit with a throttle valve mounted within said intake conduit, said system including a fuel delivery conduit extending to said engine; a fuel flow restricting orifice disposed in said fuel delivery conduit, a metering valve element registering with said orifice, governor means for adjustably positioning said valve element in response to variations in engine speed including an engine driven portion and a movable portion engageable by said driven portion, said movable portion being adapted to effect metering adjustments of said valve element, a diaphragm secured to said movable portion, at least one port formed in said intake conduit at a location confronting the periphery of said throttle valve when the latter assumes a substantially closed position, and conduit means for conducting intake manifold pressure from said port to one side of said diaphragm to create a pressure differential thereacross effective to assist said governor means in positioning said valve element to open said orifice as an inverse function of said manifold pressure when the throttle valve is moved toward a closed throttle position during part load and idling operation.

8. In a fuel control system for a liquid fuel engine having a fuel pressure source and a fuel delivery conduit extending from said source to said engine, said engine having a throttle control intake manifold conduit, an engine speed sensitive fuel metering mechanism including a fuel metering orifice forming a portion of said fuel delivery conduit, a movable fuel metering element registering with said orifice for progressively controlling the restriction of the latter upon movement thereof, a first flexible diaphragm disposed within said unit and partly defining a first fuel chamber therein, said orifice communicating with said fuel chamber, said metering element being adapted to be actuated upon movement of said first diaphragm, a second sealing diaphragm coupled to said first diaphragm, said first and second diaphragms defining a second fuel chamber, said second fuel chamber communicating with said fuel delivery conduit at a downstream location, a third diaphragm disposed adjacent said second diaphragm and coupled to said first and second diaphragms, said second and third diaphragms defining a pressure chamber therebetween, speed governor means having portions within said unit for deflecting said coupled diaphragms to vary the degree of restriction of said metering orifice, and passage means interconnecting said pressure chamber with said engine intake manifold conduit for supplementing the diaphragm deflecting effort of said governor means.

9. In a fuel control system for a liquid fuel engine having a fuel pressure source and a fuel delivery conduit extending from said source to said engine, said engine having an intake manifold conduit with a movable throttle valve disposed therein for controlling a flow of gases to said intake manifold conduit; an engine speed sensitive fuel metering mechanism including a housing, a fuel metering orifice disposed within said housing and forming a portion of said fuel delivery conduit, a movable fuel metering element registering with said orifice for progressively restricting the latter upon movement of said metering element, a first flexible diaphragm in said housing partly defining a first fuel chamber on one side thereof, said first fuel chamber communicating with said orifice, said metering element being shifted relative to said orifice by a portion of said first diaphragm to progressively decrease the degree of restriction of said orifice upon movement of said first diaphragm in one direction, a second diaphragm disposed within said housing, a third diaphragm disposed adjacent said second diaphragm, means for coupling said diaphragms for simultaneous shifting movement, engine speed responsive governor means for biasing said coupled diaphragms in said one axial direction, said second and third diaphragms defining a pressure chamber, passage means for conducting intake manifold pressure to said pressure chamber to produce a shifting force on said coupled diaphragms in said one direction, the effective working area of said second diaphragm being less than the said effective working area of said third diaphragm.

10. In a fuel metering mechanism for use with a heat engine having an engine air intake manifold, fuel conduit structure, valve means for progressively varying the rate of flow of fuel through said conduit structure comprising relatively movable valve elements situated within a portion of said conduit structure, valve actuator means for adjusting the relative position of said valve elements including engine speed responsive means effective to apply a valve shifting force to said actuator means as a function of said engine speed, and means for subjecting other portions of said actuator means to engine intake manifold pressure for providing a valve shifting effort thereto as an inverse function of said manifold pressure and supplementary to said valve shifting force.

11. In a fuel control system for a heat engine having an intake manifold conduit, fuel conduit structure for supplying said manifold conduit with fuel, valve means including relatively movable portions situated in said conduit structure for scheduling delivery of fuel therethrough to said manifold conduit, valve actuator means for adjusting the relative position of said movable valve portions including engine speed responsive portions effective to apply a valve shifting force to said actuator means as a function of said engine speed, a movable wall carried by another portion of said actuator means, and means for subjecting one side of said movable wall to intake manifold pressure for applying a supplementary valve shifting effort thereto as an inverse function of said manifold pressure and supplementary to said valve shifting force.

12. In a fuel control system for a heat engine having an intake manifold conduit, fuel conduit structure for supplying said manifold conduit with fuel, valve means including relatively movable portions situated in said conduit structure for scheduling delivery of fuel therethrough to said manifold conduit, valve actuator means for adjusting the relative position of said movable valve portions including engine powered portions for energizing the same, a movable wall carried by another portion of said actuator means, a second movable wall having an effective working area less than the effective working area of said first movable wall and situated in adjacent relationship with respect to said first movable wall for movement in tandem therewith, said first and second movable walls defining a pressure chamber therebetween, and passage means interconnecting said pressure chamber with said manifold conduit for subjecting said actuator means to a supplementary valve actuating force.

13. In a fuel control system for a heat engine having an intake manifold conduit, a movable throttle valve mounted within said conduit, fuel conduit structure for supplying said manifold conduit with fuel, valve means including relatively movable portions situated in said conduit structure for scheduling delivery of fuel therethrough to said manifold conduit, valve actuator means for adjusting the relative position of said movable valve portions including engine powered portions for energizing the same, a movable wall carried by another portion of said actuator means, a second movable wall having an effective working area less than the effective working area of said first movable wall and situated in adjacent relationship with respect to said first movable wall for movement in tandem therewith, said first and second movable walls defining a pressure chamber therebetween, at least one port formed in said intake manifold conduit at a location closely adjacent the peripheral edge of said throttle valve when the latter assumes a substantially closed position, and pressure passage means interconnecting said pressure chamber with said port.

14. In a fuel control system for a liquid fuel engine having an intake manifold conduit with a throttle valve mounted within said intake conduit, said system including a fuel delivery conduit extending to said engine; a fuel flow restricting orifice disposed in said fuel delivery conduit, a metering valve element registering with said orifice, governor means for adjustably positioning said valve element in response to variations in engine speed including an engine driven portion and a movable portion engageable by said driven portion, said movable portion being adapted to effect metering adjustments of said valve element, a diaphragm secured at a central portion thereof to said movable portion, at least one port formed in said intake conduit in the immediate vicinity of the periphery of said throttle valve when the latter assumes a substantially closed position, and conduit means having branch portions communicating with said port and with said intake manifold conduit on the downstream side of said throttle valve for conducting intake manifold pressure from said intake manifold pressure to one side of said diaphragm to create a pressure differential thereacross as the throttle valve is moved toward a closed throttle position during part load and idling operation.

15. In a fuel control system for a liquid fuel engine having an intake manifold conduit with a throttle valve mounted within said intake conduit, said system including a fuel delivery conduit extending through said engine; a fuel flow restricting orifice disclosed in said fuel delivery conduit, a metering valve element registering with said orifice, governor means for adjustably positioning said valve element in response to variations in engine speed including an engine driven portion and a movable portion engageable by said driven portion, said movable portion being adapted to effect metering adjustments of said valve element, a diaphragm secured at a central portion thereof to said movable portion, at least one port formed in said intake conduit in the immediate vicinity of the periphery of said throttle valve when the latter assumes a substantially closed position, conduit structure having branch portions extending to said port and to said intake manifold conduit on the downstream side of said throttle valve, an air passage intersecting said conduit structure for admitting ambient air to the latter, pressure regulator valve means in said air passage for normally blocking the latter and for opening the same when the engine intake manifold pressure decreases below a precalibrated limit, and calibrated orifices situated in at least one of the branch portions of said conduit structure for regulating the magnitude of the pressure transmitted through said conduit structure.

16. In a fuel metering mechanism for use with a heat engine having an engine air intake manifold with a throttle valve movably mounted therein, fuel conduit structure, valve means for progressively varying the rate of flow of fuel through said conduit structure comprising relatively movable valve elements situated within a portion of said conduit structure, valve actuator means for adjusting the relative position of said valve elements including an engine driven portion for energizing said actuator means in response to variations in engine speed, a manifold port in said intake manifold at a location substantially confronting the peripheral edge of said throttle valve when the latter is in closed position, conduit means for subjecting other portions of said actuator means to engine intake manifold pressure for providing a supplementary valve shifting effort thereto, said conduit means including separate branch portions extending to said manifold port and to said intake manifold on the downstream side of said throttle valve respectively, a calibrated orifice in at least one of said branch portions, and a valve controlled air passage communicating with said conduit structure for supplying the latter with ambient air.

References Cited in the file of this patent

UNITED STATES PATENTS

| 2,378,036 | Reggio | June 12, 1945 |
| 2,410,773 | Chandler | Nov. 5, 1946 |
| 2,623,509 | Gold et al. | Dec. 30, 1952 |
| 2,670,724 | Reggio | Mar. 2, 1954 |

UNITED STATES PATENT OFFICE
CERTIFICATE OF CORRECTION

Patent No. 2,880,713                                               April 7, 1959

Frederick E. S. Hudspeth et al.

It is hereby certified that error appears in the printed specification of the above numbered patent requiring correction and that the said Letters Patent should read as corrected below.

Column 11, line 68, for "means or" read -- means for --.

Signed and sealed this 1st day of September 1959.

(SEAL)

Attest:

KARL H. AXLINE                                              ROBERT C. WATS( Attesting Officer                                          Commissioner of Pate(